Patented Sept. 26, 1944

2,359,072

UNITED STATES PATENT OFFICE 2,359,072

METHOD OF PROVIDING A MATTE FINISH UPON POLISHED GLASS SURFACES

Frederick W. Adams, Pittsburgh, Pa., assignor to Pittsburgh Plate Glass Company, Allegheny County, Pa., a corporation of Pennsylvania No Drawing. Application March 13, 1943, Serial No. 479,062

3 Claims. (Cl. 41—42)

The present invention relates to the etching of polished glass surfaces and notably of the surfaces of structural glasses of the type of that sold under the trade name of "Carrara" in order to give it a matte or dull finish.

One object of the invention is to provide a process of etching the surfaces of glass to provide a matte finish, which is simple and inexpensive to practice and which produces a uniform and pleasing texture of the surface.

It has heretofore been proposed to form matte or dull finishes upon glass surfaces by exposing the surfaces to the action of an etching agent, such as hydrofluoric acid. In this operation the entire surface is more or less etched.

In accordance with the provisions of the present invention it is proposed to provide glass and notably structural glasses, such as coloured glasses, sold under the trade name of "Carrara" having bright or highly polished surfaces with a matte or dull finish in a stipple pattern by applying to the surface a thin film of a protective or masking plastic material containing an active pigment and then subjecting the surface to an etching acid, in order to attack those portions of the surface immediately below the particles of active pigment.

In the practice of the invention various soluble or heat fusible thermoplastic materials may be employed in the formation of the film on the glass surfaces to be treated. Among these may be included, vinyl resins, e. g., vinyl butyral, vinyl chloride and the copolymer of vinyl acetate and vinyl chloride, known under the trade name of Vinylite "H." Other plastics contemplated include cellulose acetate, cellulose ether, rubber, isomerized or polymerized, rubber chloride and hydrochloride polymerized styrene and the like. Thin films of paraffin or ester waxes, such as beeswax are also contemplated.

These various plastic substances may be made up into solution with the appropriate solvents, such as the lower alcohols (suitable for polyvinyl butyrate), methyl ethyl ketone (suitable for the copolymer of vinyl acetate and vinyl chloride), ethyl acetate (suitable for cellulosic plastics) and the like. The plastics are made up to a concentration appropriate for the specific mode of application. The desired "active" pigmentary body is incorporated with the solution of plastic.

The term "active" as applied to pigments includes finely-divided compounds that are non-reactive and insoluble in plastic solutions, but that can be dissolved out of a film of the plastic by means of water or other non-solvent for the film. It, also, includes pigmentary materials that will react with and dissolve in acids and pigmentary bodies that will react with strong mineral acids to liberate hydrofluoric acid to etch the glass. The first group is typified by sodium or calcium chloride which are insoluble in organic solvents, but soluble in water. The second glass is typified by calcium carbonate, calcium oxide, magnesium oxide, zinc oxide and zinc sulfide, which react with acids, such as hydrochloric acid or hydrofluoric acid to form water-soluble compounds. The third class is represented by fluoride bodies in finely-divided form, e. g., calcium or magnesium fluoride. These react with strong mineral acid, such as sulfuric acid or phosphoric acid to liberate hydrofluoric acid in situ, which acts as an etching acid.

The compositions are applied to the glass surface in films of desired thickness and are then allowed to dry by evaporation of solvent. Drying of course can be facilitated by application of heat or by applying the films to glass which has been mildly heated, for example, to a temperature of 100° C. or 200° C.

The glass, after it has been coated, is then subjected to the action of an agent which will dissolve out pigmentary particles embedded in the plastic films. In the case of water-soluble pigments, such as sodium chloride and calcium chloride, this solvent may be merely water. In the case of the oxides of metals and calcium carbonate, an acid should be employed. Aqueous sulfuric acid or hydrofluoric acid are suitable. These will remove the pigmentary material wherever particles are at or near the surface of the film to leave the surface of the glass beneath exposed. However, they do not substantially attack the surface of the glass itself. In order to etch the latter the initial acid treatment should be followed with treatment with hydrofluoric acid. Such hydrofluoric acid etching may be effected by contacting the surface with dilute, e. g., 15% hydrofluoric acid or by exposing the surface to the action of hydrofluoric acid vapors in a suitable chamber.

Obviously it is permissible to treat the coated surfaces initially with hydrofluoric acid to attack and dissolve out the reactive pigmentary material. After the surface of the glass beneath has been exposed in this manner the desired etching effect will then take place. This will of course require more acid than is required in those cases where the pigment is removed before application of the hydrofluoric acid. In the two-stage process the two acids may be combined in a single mixture. Thus films containing oxides, e. g., calcium or magnesium oxide may be treated with a dilute mixture of hydrogen fluoride and sulfuric or phosphoric acid.

Fluoride pigments, such as calcium fluoride will react with strong mineral acids, such as sulfuric acid to liberate hydrofluoric acid in situ, which will then attack the glass beneath. If these fluoride pigments are employed the use of hydrofluoric acid in solution is reduced or entirely eliminated.

If it is desired to insure that a maximum of the active pigmentary particles will be exposed to the action of solvent or acid at the surface of the plastic film, it may be desired to subject the film to a slight buffing action with rouge or other mild abrasive in order to cut away the outer layers of the film and leave the pigmentary particles beneath exposed. The buffing action, of course, should not be so vigorous as to remove the film entirely from the surface. Subsequently the surface will be treated with acid.

The length of time required for etching of the glass of course will vary with the depth to which it is desired to etch the glass. However, for most purposes probably 10 to 15 minutes is sufficient, although this period may be substantially extended, if so desired.

After the glass is adequately etched, the surface should be washed free of hydrofluoric acid and dried. The plastic film constituting the mask should then be removed. Removal may be effected in various ways, for example, by scraping or brushing or by means of a solvent for the plastic. In some instances the removal may be effected by subjecting the glass plate to heat sufficient to char the plastic film. The latter can then be easily brushed away. In the case of plastics containing vinyl chloride the charring effect might be promoted by incorporating into the plastic solution small amounts of iron salts, which apparently catalyze the decomposition of the vinyl films.

The forms of the invention herein shown and described are to be considered merely as exemplary. It will be apparent to those skilled in the art that numerous modifications may be made therein without departure from the spirit of the invention or the scope of the appended claims.

What I claim is:

1. A process of etching glass to obtain a matte surface comprising coating the surface with a film of acid-resistant, organic plastic material containing a pigment which is removable by strong acids, slightly buffing the surface of the film in order to assure exposure of the particles, then removing the pigmentary material with an acid and exposing the surface beneath the openings left by solution of the particles to etching with hydrofluoric acid.

2. A process of etching glass to obtain a matte surface, which comprises coating the surface with a solution of an organic plastic containing dispersed particles of inorganic pigment insoluble in the solvent for the plastic, the pigment being soluble in solvents which are non-solvents for the plastic, the plastic further being insoluble in hydrofluoric acid etching baths, evaporating the solvent for the plastic to leave a solid film of plastic containing dispersed particles of pigment, dissolving out the particles of pigment with a non-solvent for the plastic and etching the points in the surface thus exposed with hydrogen fluoride.

3. A process of etching a polished glass surface to provide a matte finish which process comprises coating the surface with a solution in a volatile organic solvent of an organic resin which is resistant to a hydrofluoric acid as well as strong mineral acids that attack its inorganic salts to liberate hydrofluoric acid, said solution containing a finely divided fluoride salt as a pigment, evaporating the solvent from the solution to form a thin solid film, then treating the surface with a strong mineral acid capable of reacting with fluoride salt to release hydrogen fluoride whereby to etch the surface of the glass beneath the particles of pigment while leaving the surface covered by the plastic unetched.

FREDERICK W. ADAMS.